D. F. VAN LIEW.
Freight-Car Door.
No. 9,219. Reissued May 25, 1880.
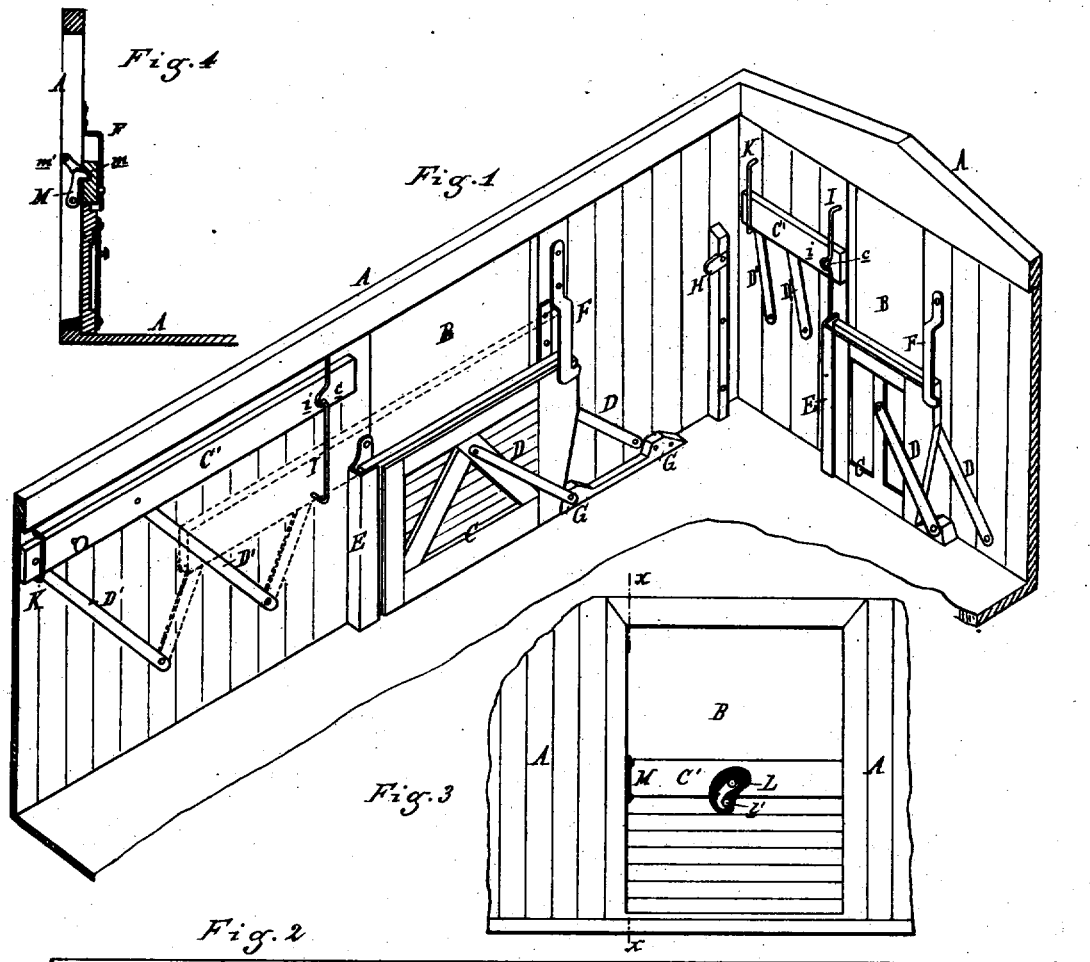
Attest:
N. Barthel
Chas. J. Hunt
Inventor:
D. F. Van Liew
By Atty
Chas. S. Sprague
N. PETERS, PHOTO-LITHOGRAPHER, WASHINGTON, D. C.

UNITED STATES PATENT OFFICE.

DENNIS F. VAN LIEW, OF AURORA, ILLINOIS.

FREIGHT-CAR DOOR.

SPECIFICATION forming part of Reissued Letters Patent No. 9,219, dated May 25, 1880

Original No. 152,439, dated June 23, 1874. Application for reissue filed March 26, 1880.

*To all whom it may concern:*

Be it known that I, DENNIS F. VAN LIEW, of Aurora, Kane county, in the State of Illinois, have invented certain new and useful Improvements in Grain-Cars; and I do hereby declare that the following is a full, clear, and exact description thereof, reference being had to the accompanying drawings, making a part of this specification.

Figure 1 is a perspective view of the interior of a car, showing the openings in its side and end inclosed by means of my improved door. Fig. 2 is an elevation of the inner face of one side of said car, showing the door removed from its opening and the cattle-bar placed across the same. Fig. 3 is a like view of the outer face of said car side, showing the door and cattle-bar placed across its opening and locked in position; and Fig. 4 is a vertical section upon line *x x* of Fig. 3.

Letters of like name and kind refer to like parts in each of the figures.

The design of my invention is to enable the doorway within the sides or ends of a car to be more easily closed or unclosed when desired, and to reduce the cost of construction and lessen the liability to injury or derangement of the inclosing door or bar; to which end it consists, principally, in an inclosing-door or cattle-bar pivoted to or upon the ends of radius-bars, that are, in turn, pivoted upon the side of a car, and capable of being moved in a vertical plane across or from the doorway without change in its horizontality, substantially as and for the purpose hereinafter specified.

It consists, further, in the means employed for confining the door or cattle-bar against the side of the car, substantially as hereinafter set forth.

It consists, further, in the means employed for locking together the door and cattle-bar when arranged across the doorway, substantially as hereinafter shown and described.

It consists, finally, in the means employed for locking the cattle-bar separately in position across the doorway, substantially as hereinafter specified.

In the annexed drawings, A represents a freight-car constructed in the usual manner, and provided within its sides and ends with the usual openings or doorways B and B, and the ordinary appliances for inclosing the same upon the outer side when used for ordinary freight purposes.

In order that the car may be fitted for use in the carriage of grain, a door, C, is provided, which has the usual height and a length somewhat greater than the width of the doorway B, and has pivoted at its longitudinal center, and near its upper edge, one end of a metal bar, D, which from thence extends rearward and downward, and has its opposite end, in turn, pivoted upon the inner face of the side of said car just above the floor. A second similar bar, D, is in like manner pivoted to the rear end of said door, and upon said car side, at a distance in rear of the lower end of said bar D just equal to the distance between their upper ends.

The lengths of the bars D D and their points of attachment to the door C and to the car side are such as to enable said door to be placed across the doorway B, as shown in Figs. 1 and 3, or to be moved edgewise upward, rearward, and again downward away from said doorway, as shown by the dotted lines of Fig. 1, to the position shown in Fig. 2, during which operations said bars operate as pivotal bearings for said door, and upon which it moves.

The front end of the door C, when closed, is received within a metal shoe, E, which insures the lateral position of said end, while the rear end of said door is held against the inner face of the car side by means of a metal bar, F, that is attached to or upon the latter above the former, and extends downward along the inner face of said door. When moved away from the doorway B the door C rests upon blocks G G, which are sufficiently high to keep its lower edge from contact with water or other liquids that may accumulate upon the floor when the car is used for the transportation of cattle, and, by freezing, obstruct the operation of said door, while the rear end of the latter is held in its lateral position by means of a lug, H, that is secured upon the face of the car side and embraces the end and inner face of said door. The cattle-bar C′ is attached to or upon the car side upon the side of the doorway B opposite to the door C in the same manner and by the same means as are employed in case of said door, the pivotal bars D′ D′ being the same and performing precisely the same office in each case. The cattle-bar C′ is arranged vertically, so as to rest upon the upper edge of the door C when both are placed across the doorway B, in which position the forward end of said cattle-bar passes between the guide-bar F and the car side, while a second guide-bar, I, secured upon the latter and extending around the central portion of said cattle-bar, holds the same in lateral position.

When moved away from the opening or doorway B the cattle-bar C′ occupies a position near the roof of the car, and is held against the car side by means of the guide-bar I and a similar shorter bar, K, placed so as to receive its rear end. A pin, *c*, projecting horizontally inward from the inner side, and near the forward end of the cattle-bar C′, passes into a corresponding notch, *i*, that is provided within the guide-bar I, and furnishes a support for the portion of said bar which is in front of the pivotal bars.

When the cattle-bar and door are closed, as shown in Figs. 1 and 3, they are secured in such position by means of a hook, L, which is pivoted upon the outer face of said bar, and engages with a pin, *l*, that projects outward from the corresponding face of said door.

When the cattle-bar alone is closed it is locked in position by means of a hook, M, that is pivoted upon the face of the doorway B, and has its hooked end contained within a corresponding recess, *m*, that is provided within the outer face of said bar. A button, *m′*, is pivoted upon the face of said door-frame above said hook, in such relative position as to be capable of turning downward against the latter and locking the same in engagement with said bar.

The advantages obtained by this construction and combination of parts are as follows:

First, the door and cattle-bar occupy no available space, and can be opened or closed when the car is loaded.

Second, while said parts are as easily moved across or from the doorway as are those which turn edgewise upon a single pivotal bearing, much less vertical space is required for their operation, and consequently they can be applied to cars that have such low roofs as to render impracticable the use of other forms of door or cattle-bar.

Third, it is entirely practicable to use my cattle-bar and door without the usual housing or casing for receiving and containing them when open, by which means a considerable saving is effected in cost and less difficulty is experienced in making repairs or changes when necessary.

What I claim as my invention, and desire to secure by Letters Patent, is—

1. The combination of the door C with a fixed elevated support, G, above and clear of which the door passes endwise, and upon which it is supported when thrown back and out of use for closing the doorway.

2. The combination of the door C, one or more radius-bars, and a fixed elevated support, G, above which the door passes endwise, and upon which it is supported when thrown back and out of use for closing the doorway, with the lug H, substantially as shown.

3. In a railroad freight-car, a door or cattle-bar for closing a doorway, in combination with one or more radius-bars pivoted to the side of the car and to said door, by means of which said door may be moved in a vertical plane across or from the doorway, substantially as described.

4. The combination of the door, pivoted to the side of a car by means of one or more radius-bars, and the support G, above which the door slides as it is being opened, and by which said door is maintained in its elevated position when opened, substantially as and for the purposes specified.

5. In combination with the cattle-bar C′, to move longitudinally and edgewise, and provided with the pin *c*, the guide-bar I, attached to the car side to embrace the inner side of said bar, and having the notch *i* for the reception of said pin, substantially as and for the purposes set forth.

6. In combination with the edgewise-moving door C and cattle-bar C′, the hook L, pivoted upon the latter, to engage with the pin *l*, secured within said door, substantially as and for the purposes specified.

7. In combination with the cattle-bar C′, having an edgewise motion upon the car side, the hook M, pivoted upon the door-frame, to engage with the recess *m* formed within said cattle-bar, and the button *m′*, pivoted upon said door-frame to engage with said hook, substantially as and for the purpose shown.

8. In a freight-car, a door adapted to be moved horizontally endwise across or from the doorway of the car by mechanism substantially as described, in combination with such mechanism, and operating openly or without incasement upon or against the inner side wall of said car, substantially as and for the purposes described.

9. In a freight-car, a door which in being opened is adapted to be raised vertically, or nearly so, to relieve it from internal pressure, and then to be moved horizontally endwise by mechanism substantially as described, to uncover or disclose the doorway, in combination with such mechanism, substantially as and for the purposes specified.

DENNIS F. VAN LIEW.

Witnesses:
ELLIS P. BURKE,
F. W. BURKE.